(12) United States Patent
Alon et al.

(10) Patent No.: US 6,356,570 B1
(45) Date of Patent: Mar. 12, 2002

(54) SOURCE OF INTENSE COHERENT HIGH FREQUENCY RADIATION

(75) Inventors: Ofir Alon; Vitali Averbukh; Nimrod Moiseyev, all of Haifa (IL)

(73) Assignee: Technion Research and Development Foundation LTD, Haifa (IL)

( * ) Notice: Subject to any disclaimer, the term of this patent is extended or adjusted under 35 U.S.C. 154(b) by 0 days.

(21) Appl. No.: 09/581,989

(22) PCT Filed: Dec. 3, 1998

(86) PCT No.: PCT/IL98/00591

§ 371 Date: Aug. 11, 2000

§ 102(e) Date: Aug. 11, 2000

(87) PCT Pub. No.: WO99/33084

PCT Pub. Date: Jul. 1, 1999

(30) Foreign Application Priority Data

Dec. 12, 1997 (IL) ................................................ 122695

(51) Int. Cl.[7] ................................................. H01S 3/10
(52) U.S. Cl. .............................................. 372/22; 372/5
(58) Field of Search ............................. 372/5, 22; 1/35

(56) References Cited

U.S. PATENT DOCUMENTS 5,500,156 A * 3/1996 Marder et al. .............. 252/582
5,552,926 A * 9/1996 Owa et al. .................. 359/326
6,031,711 A * 2/2000 Tennent et al. ............. 361/303

OTHER PUBLICATIONS

Natthews et al, "Soft X–Ray Lasers", *Scientific American*, pp 58–65, Dec. 1988.
Dai et al, "Nanotubes as Nanoprobes in Scanning Propbe Microscopy", Nature, vol. 384, pp 147–149, 1996.

* cited by examiner

*Primary Examiner*—James W. Davie
*Assistant Examiner*—Davienne Monbleau
(74) *Attorney, Agent, or Firm*—Mark M. Friedman

(57) ABSTRACT

A source of intense coherent high-frequency electromagnetic radiation such as soft x-rays. A circularly polarized incident beam of coherent radiation is directed at a frequency multiplication medium that includes constituents of approximate $C_n$ symmetry, oriented so that the symmetry axes of the constituents are parallel to the incident beam. The interaction of the incident beam and the constituents of the medium produces higher harmonics of the incident frequency, up into the x-ray band. If the $C_n$ symmetry of the medium constituents is exact then the harmonic frequencies are multiples $ln\pm1$ of the frequency of the incident beam, where l is an integer. If the $C_n$ symmetry is only approximate, then the harmonics are centered around these multiples. Suitable medium constituents include dipolar molecules of $C_{5v}$ symmetry and circular rings of nanoparticles.

31 Claims, 4 Drawing Sheets

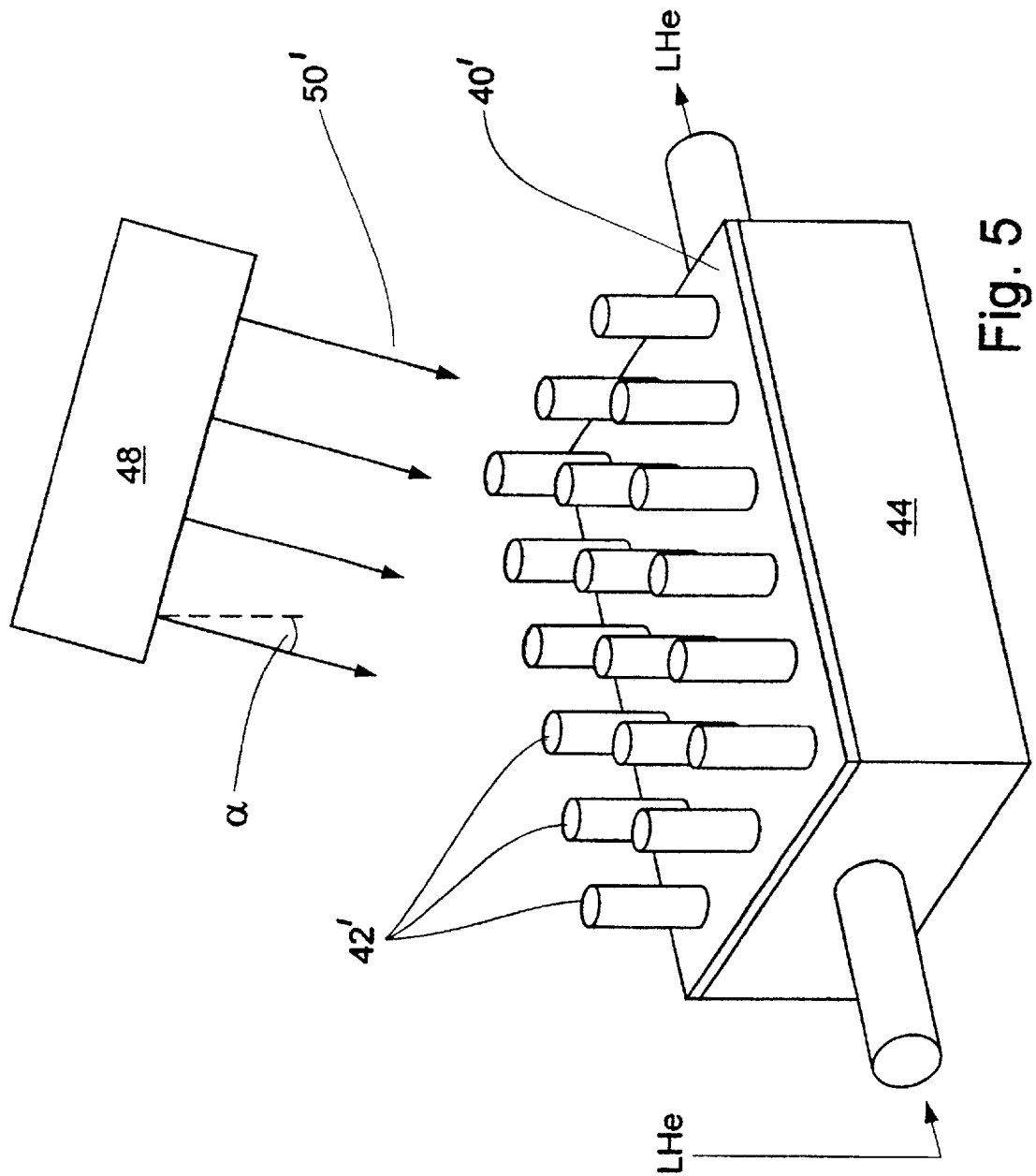

SOURCE OF INTENSE COHERENT HIGH FREQUENCY RADIATION

FIELD AND BACKGROUND OF THE INVENTION

The present invention relates to the production of high frequency coherent electromagnetic radiation such as soft x-rays and, more particularly, to a device and method for producing this radiation in limited frequency bands by frequency multiplication.

The development of masers and lasers circa 1960 stimulated speculation about applications of similar sources of coherent electromagnetic radiation that could operate at much shorter wavelengths, for example, at soft x-ray wavelengths, between about 1 nm and about 10 nm. Such applications include holographic imaging of biological structures, plasma diagnostics and the generation of intense plasmas. More recent advances in other fields have suggested other applications of coherent soft x-rays. For example, a coherent source of x-rays for CT scanning could be operated at a much lower power level tan the incoherent sources now in use, reducing the exposure of the subjects to ionizing radiation. Another application is in the fabrication of microdevices The design rule of devices such as integrated circuits is now limited by a lower bound of about 0.1 microns by several factors, not least of which is that the shortest wavelength radiation that can be used for photolithography is ultraviolet radiation. A coherent source of soft x-rays would help make even shorter design rules feasible. Similarly, a coherent source of soft x-rays would enable much denser storage of information in media such as compact disks. A sufficiently intense coherent beam of soft x-rays can be used as a weapon, or as an industrial cutting tool.

It is known to produce coherent soft x-rays using soft x-ray lasers. The first soft x-ray laser was developed at Lawrence Livermore National Laboratory in 1984. This device, which was described in general terms by Dennis Matthews and Mordecai Rosen in the December 1988 issue of *Scientific American*, uses the Nova laser both to create a plasma including high-Z ions and to create a population inversion among those ions by a process known as collisional excitation. The laser medium in such a device is inherently transient. Essentially, the mere process of creating the laser medium, by evaporating a metal foil to produce a plasma. also destroys the laser medium. The use of the Nova laser, originally developed for controlled fusion research, to create the laser medium also meant that the device was a large, expensive research tool unsuitable for practical applications. More compact soft x-ray lasers have been developed in recent years, but like their giant ancestor at LLNL, they all rely on inherently self-destructive mechanisms to create a population inversion in a highly ionized plasma.

Two non-self-destructive strategies for the generation of coherent soft x-rays also have been explored. One is the imposition of spatial periodicity on the trajectories of high energy electrons, in free-electron lasers. This requires the use of a massive high-energy accelerator to create the high energy electrons. The other is the use of frequency multiplication media to create higher harmonics of coherent light, such as ultraviolet light, produced by a conventional laser. This generally produces a broad mixture of wavelengths. For example, N. Sarukura et al. reported in *Phys. Rev. A* Vol 43 p. 1669 (1991) the creation of 9-th to 23-rd order harmonics of light from a KrF laser using helium as a frequency multiplication medium. A review of the technique may be found in A. L'Huiller et al., "High-order harmonics: a coherent source in the XUV range", *Journal of Nonlinear Optical Physics and Materials*, July 1995, Vol. 4 No. 3, pp. 647–665, which is incorporated by reference for all purposes as if fully set forth herein. More recently, Preston et al. (*Phys. Rev. A* Vol. 53 p. R31 (1996)) reported obtaining harmonics up to the 35-th using helium as a frequency multiplication medium.

There is thus a widely recognized need for, and it would be highly advantageous to have, a compact, portable, reusable source of coherent, relatively monochromatic soft x-rays.

SUMMARY OF THE INVENTION

According to the present invention there is provided a device for producing high frequency radiation, including: (a) a source of elliptically polarized radiation; and (b) a frequency multiplication medium including at least one constituent having approximate finite symmetry including an axis of approximate $C_n$ symmetry, wherein n is at least 3, and wherein the at least one constituent is oriented so that the elliptically polarized radiation includes an electrical field that is circularly polarized in a plane perpendicular to the axis.

According to the present invention there is provided a method of producing high frequency radiation, including the steps of: (a) providing a frequency multiplication medium including at least one constituent having approximate finite symmetry including an axis of approximate $C_n$ symmetry, wherein n is at least 3; and (b) directing elliptically polarized radiation at an angle to the axis such that the elliptically polarized radiation has an electric field that is circularly polarized in a plane perpendicular to the axis.

According to the present invention there is provided a device for producing high frequency radiation, including: (a) a source of elliptically polarized radiation; and (b) a frequency multiplication medium including a multiplicity of constituents sharing a common approximate shape and a common orientation aligned so that the elliptically polarized radiation has an electrical field that is circularly polarized in a plane perpendicular to the common orientation, each of the constituents having a longest dimension of at least about 6 Å.

According to the present invention there is provided a method of producing high frequency radiation, including the steps of: (a) providing a frequency multiplication medium including a plurality of constituents sharing a common approximate shape and a common orientation, each of the constituents having a longest dimension of at least about 6 Å; and (b) directing elliptically polarized radiation at an angle to the common orientation such that the elliptically polarized radiation has an electric field that is circularly polarized in a plane perpendicular to the common orientation.

An object is said to have an axis of $C_n$ symmetry if the object is invariant under rotations by integral multiples of $2\pi/n$ about this axis. The full point group of the object can be of higher symmetry than $C_n$, for example $D_n$, as long as the object has a $C_n$ axis of symmetry. It is demonstrated in the Appendix that a circularly polarized beam of coherent electromagnetic radiation, incident on a medium whose constituents have commonly oriented $C_n$ symmetry axes, causes the generation and amplification of specific harmonics of the incident beam. If the angular frequency of the incident beam is $\omega$, then the harmonics produced are circularly polarized beams, parallel to the incident beam, of angular frequencies (ln±1)ω, where l is an integer, with the "+" beams circularly polarized in the same direction as the incident beam and the "−" beams circularly polarized in the opposite direction. So, for example, a circularly polarized beam of a wavelength of 500 nm incident on a medium whose constituents have $C_5$ symmetry axes generates, among others, circularly polarized l=20 harmonics with wavelengths of 5.05 nm (99th harmonic) and 4.95 nm (101st harmonic), in the middle of the soft x-ray band. It should be noted that the scope of the present invention is restricted to the case of n≧3, as the case of n=2 reproduces the selection rules of the prior art. In addition, the incident electromagnetic radiation may be elliptically polarized, rather than circularly polarized, as long as the electric field of the incident electromagnetic radiation is circularly polarized in the plane perpendicular to the symmetry axes.

It also is demonstrated in the Appendix that the amplification efficiency of medium grows dramatically with system size, even if the $C_n$ symmetry is not perfect. If the constituents of the medium are large (on an atomic scale) ring-like structures, then the medium produces a range of angular frequencies centered around the frequencies determined by the (ln≧1)ω selection rules, at much higher intensities than are attainable by the prior art methods. In addition, under conditions of only approximate $C_n$ symmetry, the radiation produced is not exactly circularly polarized.

It is important to note that to the extent that the present invention relies on the approximate symmetry of the constituents of the frequency multiplication medium, that symmetry is finite. In other words, the constituents which are brought under the scope of the present invention by virtue of having approximate $C_n$ symmetry axes do not have infinite order (e.g., C∞) symmetry axes. In fact, a frequency multiplication medium made of constituents with parallel C∞ symmetry axes would not function within the scope of the present invention, because the photons of the "higher harmonics" that would be generated would have to have infinite frequency, and therefore infinite energy. Thus, the helium atoms of the prior art frequency multiplication media do not fall within the scope of the present invention because they are spherically symmetrical, and have an infinite number of C∞ axes, along with an infinite number of $C_n$ axes for all finite n. Indeed, the mechanism by which helium atoms function as elements of a frequency multiplication medium is totally different from the mechanism described in the Appendix.

Several types of media may be used for such frequency multiplication of circularly polarized light from sources based on conventional lasers. One such medium consists of a gas of dipolar molecules of $C_{nv}$ symmetry, which have $C_n$ symmetry axes in the direction of the dipole moments. The molecules are oriented by an externally applied electric field so that all their $C_n$ axes are parallel. Another such medium consists of circular rings of metallic nanoparticles oriented with their approximate $C_n$ axes parallel, for example by having been deposited on a planar substrate. The incident beam is perpendicular to the plane of the substrate. A third such medium consists of parallel carbon nanotubes, which have parallel, exact or approximate $C_n$ symmetry axes, with n typically between 6 and 9. In all three cases, the incident beam is parallel to the exact or approximate $C_n$ axes.

As used herein, the term "constituent" refers to a medium component that, individually, includes the desired exact or approximate $C_5$ axis. For example, the constituents of the $C_5H_5Tl$ gas that have the desired (exact) $C_5$ axes are the $C_5H_5Tl$ molecules themselves; and the constituents of the array of nanoparticle rings that have the desired (approximate) $C_n$ axes are the nanoparticle rings themselves.

BRIEF DESCRIPTION OF THE DRAWINGS

The invention is herein described, by way of example only, with reference to the accompanying drawings, wherein:

FIG. 5 is a schematic illustration of a device of the present invention based on nanotubes as a frequency multiplication medium.

DESCRIPTION OF THE PREFERRED EMBODIMENTS

The present invention is of a device and method for the production and frequency multiplication of coherent circularly polarized light. Specifically, the present invention can be used to produce intense, coherent, relatively monochromatic soft x-rays.

The principles and operation of the production of high frequency radiation according to the present invention may be better understood with reference to the drawings and the accompanying description.

Figure 1:
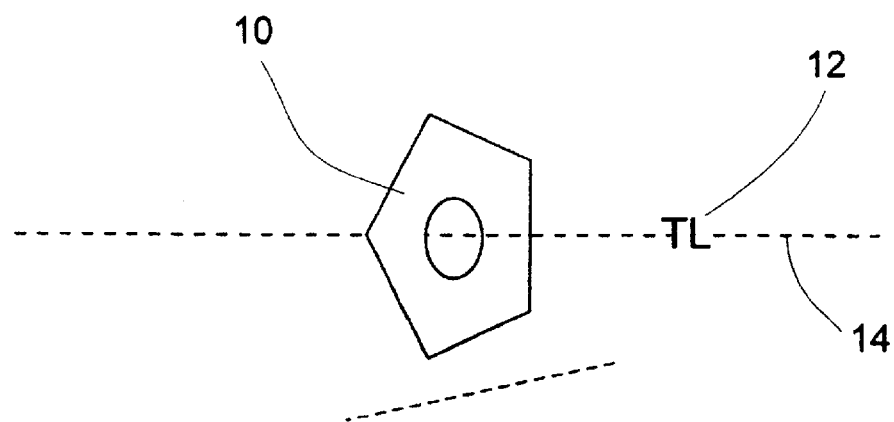
FIG. 1 illustrates a molecule of $C_5H_5Tl$ and its $C_5$ symmetry axis.

Referring now to the drawings, FIG. 1 illustrates a molecule of a compound useful as a frequency multiplication medium of the present invention: cyclopentadienyl thallium ($C_5H_5Tl$) This molecule, which consists of a conjugated $C_5H_5$ ring 10 and a thallium atom 12, exhibits $C_{5v}$ symmetry, and so has a $C_5$ symmetry axis. This molecule also has a dipole moment along its $C_5$ symmetry axis 14, with the thallium end being positive and the conjugated ring end being negative. $C_5H_5Tl$ may be purchased from Aldrich Chemical Co. of Milwaukee Wis.

Figure 2:
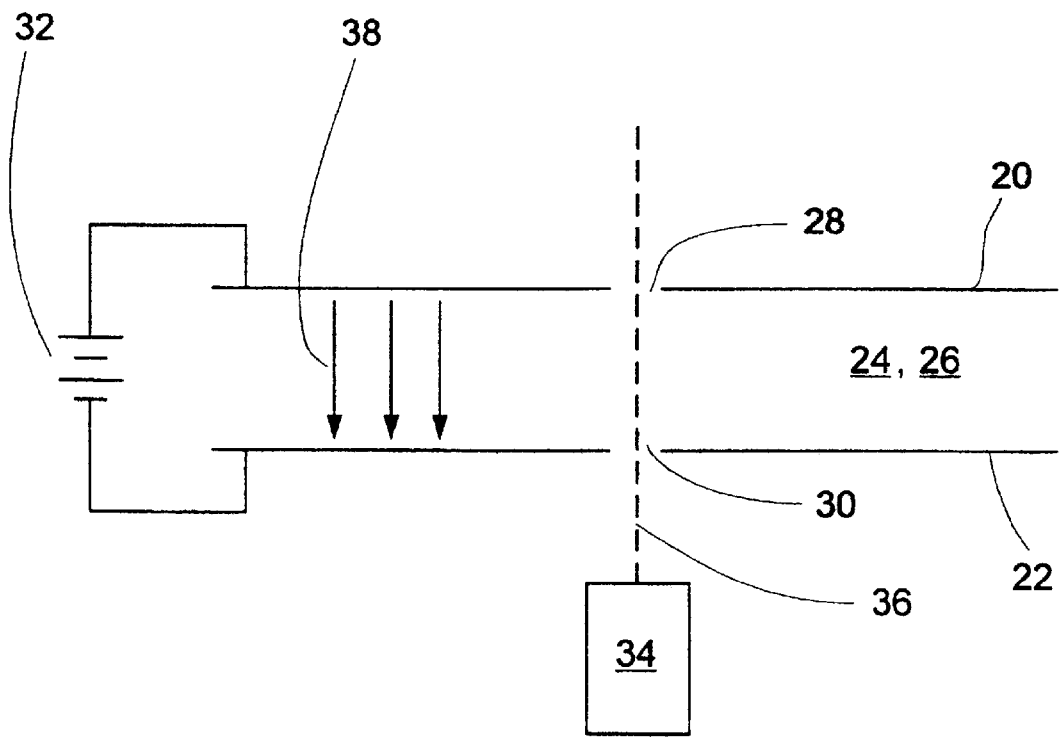
FIG. 2 is a schematic diagram of a device of the present invention based on $C_5H_5Tl$ gas as a frequency multiplication medium.

FIG. 2 is a schematic diagram of a device of the present invention based on $C_5H_5Tl$ as a frequency multiplication medium. Two parallel, electrically conducting plates 20 and 22 define between them a gap 24 filled with gas-phase $C_5H_5Tl$ 26. A source 32 of DC voltage imposes an electric field 38 on gap 24 that is perpendicular to plates 20 and 22. Electric field 38 orients the molecules of $C_5H_5Tl$ 26 so that the $C_5$ symmetry axes thereof are perpendicular to plates 20 and 22. A laser-based device 34 directs a beam 36 of coherent, circularly polarized light through gap 24 via aperture 28 in plate 20 and aperture 30 in plate 22. Beam 36 is parallel to the $C_5$ symmetry axes of the molecules of $C_5H_5Tl$ 26. The interaction of beam 36 with oriented $C_5H_5Tl$ 26 produces higher harmonics of beam 36. These higher harmonics emerge from aperture 28 along with beam 36. Suitable laser-based devices 34 are described in the review article by L'Huiller et al. It also is well-known in the art how to-transform linearly polarized coherent light, such as is emitted by a laser, into circularly polarized coherent light, using beam splitters and quarter wave plates. Suitable quarter wave plates are available inter alia from Spindler & Hoyer GMBH & Co., Göttingen, Germany.

The harmonics generated by the device of FIG. 2 are the 4th, 6th, 9th, 11th, etc. harmonics of beam 36. These harmonics thus are more restricted in frequency content, and also more intense, than the consistently odd harmonics that would be produced by the prior art methods, but they are not in any way monochromatic. Monochromaticity may be approached more closely by using a frequency multiplication medium whose components have a higher degree of rotational symmetry, for example, circular rings of nanoparticles. Pamela Ohara, James Heath and William Gelbart ("Self-assembly of submicrometer rings of particles from solutions of nanoparticles", Angew. Chem. Int. Ed. Engl., Vol. 36 no. 10 pp. 1078–1080 (1997), which is incorporated by reference for all purposes as if fully set forth herein) reported the creation of circular rings of silver nanoparticles on a graphite substrate. These rings have approximate $C_n$ symmetry axes, perpendicular to their planes. In one reported example, a ring 0.9 microns in diameter consisted of silver nanoparticles 2.5 nm across. This ring therefore has an axis of approximate $C_n$ symmetry, with n≈2260. For the purposes of the present invention, "approximate $C_n$ symmetry" means that the geometry of the medium constituent is close enough to having an exact $C_n$ symmetry axis for the medium to function as a frequency multiplication medium. It is the fact that all of the nanoparticles have approximately the same size, as can be seen in FIG. 1 of Ohara et al., that gives the rings approximate $C_n$ symmetry. If the nanoparticle sizes were randomly distributed, the rings would have no rotational symmetry.

Figure 3:
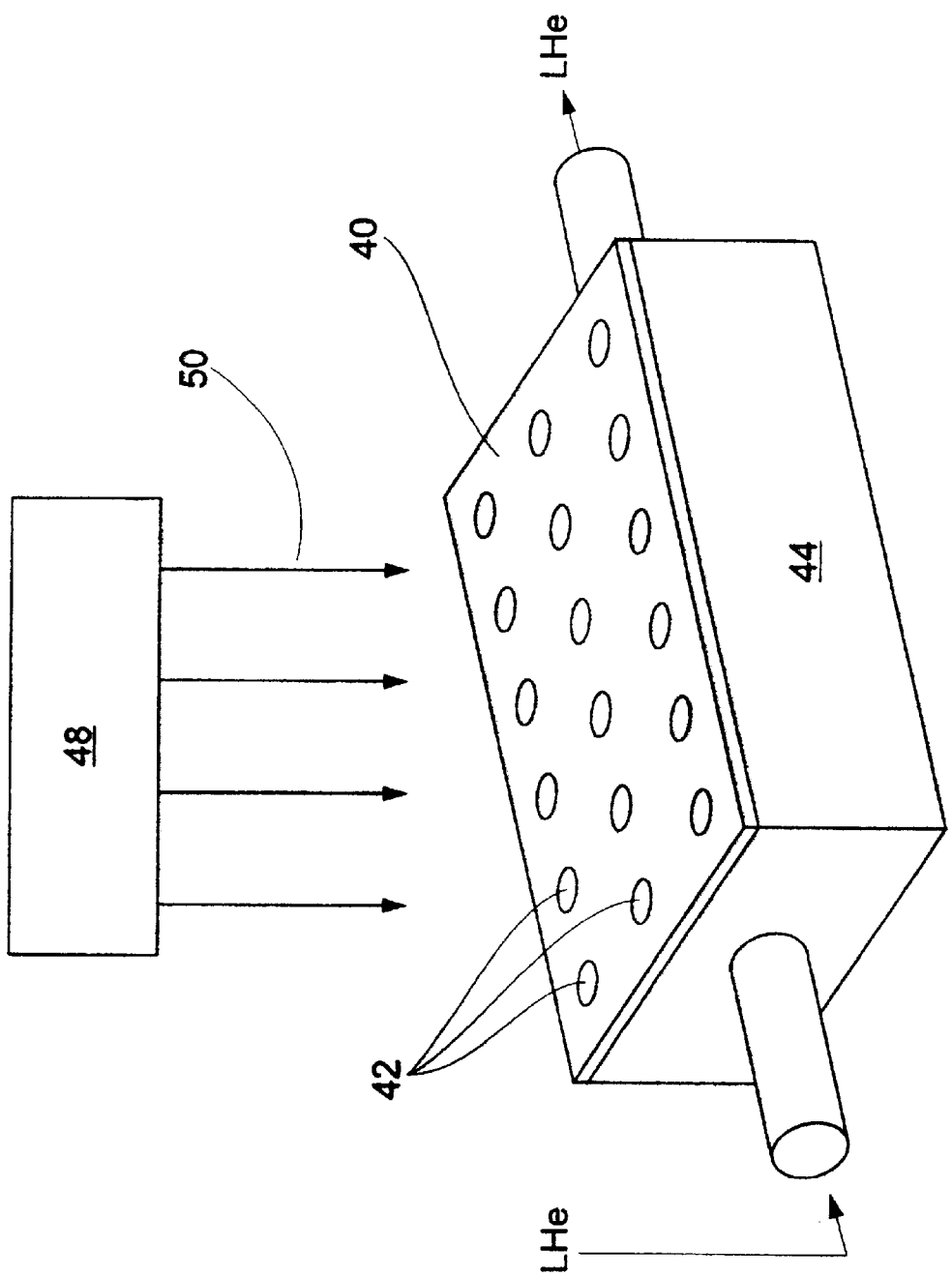
FIG. 3 is a schematic illustration of a device of the present invention based on nanoparticle rings as a frequency multiplication medium

FIG. 3 is a schematic illustration, partly in perspective, of a device of the present invention based on such rings of nanoparticles as the frequency multiplication medium. Nanoparticle rings 42 are deposited on a planar graphite substrate 40 as taught by Ohara, Heath and Gelbart. Substrate 40 is thermally coupled to a cooling chamber 44 through which flows liquid helium (LHe). The purpose of the cooling is to reduce dissipation in nanoparticle rings 42. A laser-based device 48, similar to device 34, directs a beam 50 of coherent, circularly polarized light towards substrate 40. Beam 50 is perpendicular to substrate 40, and so is parallel to the $C_n$ symmetry axes of nanoparticle rings 42. The interaction of beam 50 with nanoparticle rings 42 produces higher harmonics of beam 50. Because of the very high order symmetry of nanoparticle rings 42, the higher harmonics are very restricted in frequency content. Because graphite is transparent to soft x-rays, higher harmonics in the soft x-ray band emerge from the side of substrate 40 opposite to nanoparticle rings 42.

If nanoparticle rings 42 have axes of approximate $C_{2000}$ symmetry, and the laser of device 48 is a carbon dioxide laser, so that the wavelength of beam 50 is 10.6 microns, the wavelength of the harmonics is centered around 5.3 nm. As noted by Ohara, Heath and Gelbart, the diameters of nanoparticle rings 42 varies inversely with the concentration of the solution used to produce nanoparticle rings 42. Ohara, Heath and Gelbart used a concentration of about $10^{14}$ particles per ml. A concentration of about $2\times10^5$ particles per ml produces nanoparticle rings 42 with axes of approximately $C_{100}$ symmetry. A circularly polarized beam 50 with a wavelength of 500 nm, when directed perpendicularly at such nanoparticle rings 42, produces harmonics with wavelengths centered around the dominant wavelengths of 5.05 nm and 4.95 nm.

The amplification efficiency of the device of FIG. 3 is increased if nanoparticle rings 42 are ionized, because the transition dipole moments of ionized systems are higher than the transition dipole moments of neutral systems. This ionization occurs naturally if beam 50 is sufficiently intense (at least about $10^{11}$ W/cm$^2$).

It should be noted that the frequency multiplication medium constituents of the present invention are considerably larger than the prior art frequency multiplication medium constituents. The largest prior art constituent used heretofore is the $SF_6$ molecule. The $SF_6$ molecule is octahedral, with an S-F bond length of 1.58 Å. Using the 1.33 Å radius of the F$^-$ ion as an upper bound on the radius of an F atom gives an upper bound of 5.82 Å on the largest dimension of the $SF_6$ molecule. The largest dimension of the frequency multiplication media constituents of the present invention commonly is larger, even much larger, than about 6 Å. For example, the smallest nanoparticle ring is about 100 nm in diameter.

Figure 4:
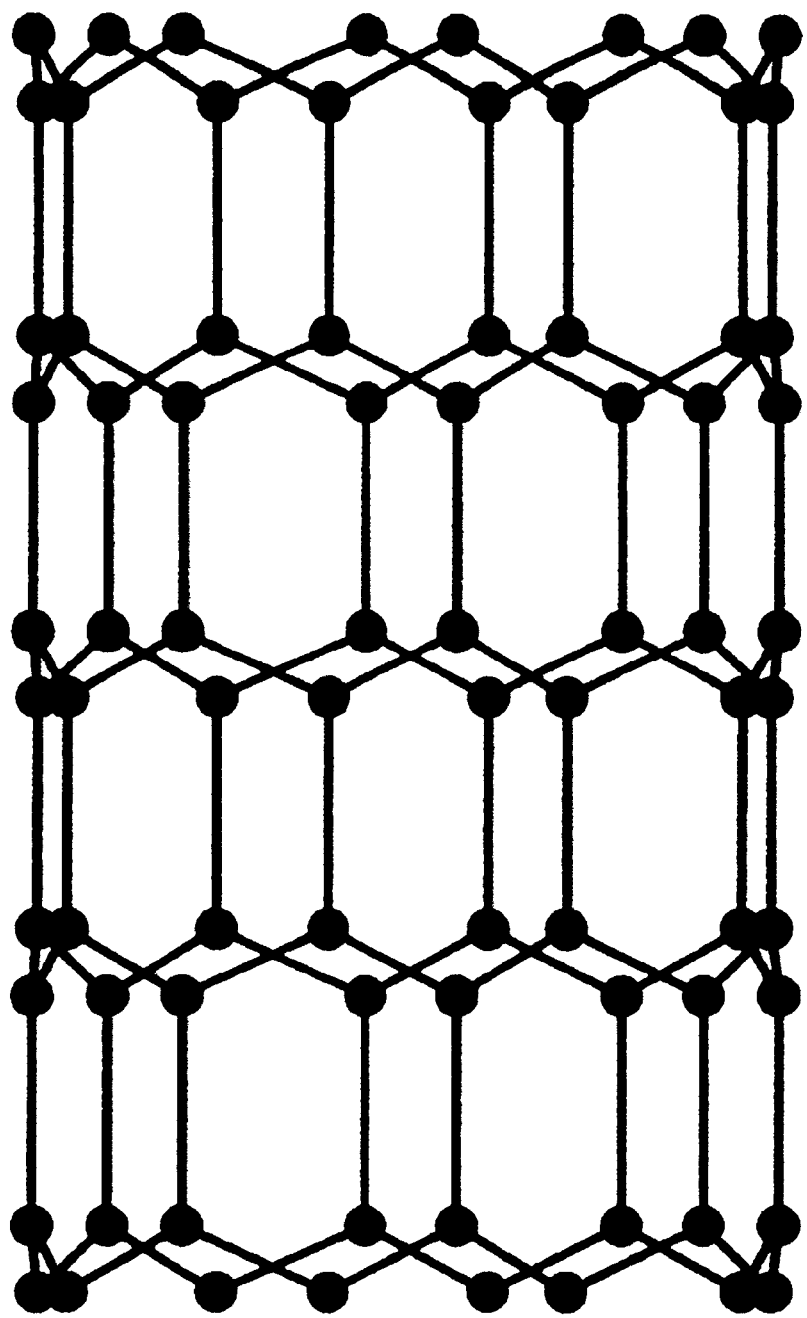
FIG. 4 illustrates an (8,0) carbon nanotube

Another class of frequency multiplication medium constituents of the present invention is the nanotubes. These are cylinders, typically of carbon, that have a graphitic structure. FIG. 4 illustrates the structure of a carbon nanotube that has eight graphite rings per row. This nanotube has an exact $C_8$ symmetry axis. More generally, the nanotubes consist of either rings or interleaved helices of carbon, boron nitride, or mixtures thereof. The geometry of a nanotube is described by a pair of numbers, the first of which is the number of graphite rings circumferentially around the nanotube, and the second of which is the helicity of the nanotube. For example, the nanotube of FIG. 4 is a (8,0) nanotube. Nanotubes with zero helicity have exact $C_n$ symmetry axes. Nanotubes with non-zero helicity have approximate $C_n$ symmetry axes. Typically, carbon nanotubes with zero helicity have between 6 and 9 graphite rings per row, and so have exact $C_n$ symmetry axes, with $6 \leq n \leq 9$. Like nanoparticle rings, nanotubes have a longest (axial) dimension that is considerably longer than 6 Å.

Individual nanotubes may be mounted on a suitable substrate, as shown by Honjie Dai et al., "Nanotubes as nanoprobes in scanning probe microscopy", Nature, Vol. 384 pp. 147–150 (Nov. 14, 1996), which is incorporated by reference for all purposes as if fully set forth herein. Many nanotubes may be mounted parallel, perpendicular to a polymer substrate, as shown by de Heer et al., "Aligned carbon nanotubes films: production and optical and electronic properties", Science, Vol. 268 pp. 845–847 (May 12, 1995), which is incorporated by reference for all purposes as if fully set forth herein. Suitable nanotubes are available from Material and Electrical Research Corp. of Tucson Ariz.

FIG. 5 is a schematic illustration, partly in perspective, of a device of the present invention based on an assembly of nanotubes as the frequency multiplication medium. The device of FIG. 5 is similar to the device of FIG. 3, with graphite substrate 40 replaced with a polymer substrate 40', and with nanoparticle rings 42 replaced with nanotubes 42' having their cylindrical axes perpendicular to substrate 40'. In addition, device 48 directs a beam 50' of elliptically polarized light towards substrate 40', at an angle a to normal incidence. Beam 50' is such that the electrical field thereof, as a function of time t, is $$\vec{E} = E_x \cos \omega t \hat{x} + E_y \sin \omega t \hat{y}$$

The angle α is chosen so that the electric field in the plane of substrate 40' is circularly polarized. For example, if $E_x > E_y$, then angle α is in the y-z plane, and has a value of $\cos^{-1}(E_y/E_x)$. Such oblique incidence is useful in case light reflected back to device 48 would damage device 48. Although, strictly speaking, tilting beam 50' breaks the $C_n$ symmetry, because of the component of the electric field normal to the substrate 40', so that the (ln±1)ω selection rules also are no longer exact, at sufficiently small angles α the symmetry remains close enough to exact for practical purposes.

While the invention has been described with respect to a limited number of embodiments, it will be appreciated that many variations, modifications and other applications of the invention may be made.

APPENDIX

Selection rules for the Harmonic Generation Spectra

What is claimed is:

1. A device for producing high frequency radiation, comprising:
   (a) a source of elliptically polarized radiation; and
   (b) a frequency multiplication medium including at least one constituent having approximate finite symmetry including an axis of approximate $C_n$ symmetry, wherein n is at least 3, and wherein said at least one constituent is oriented so that said elliptically polarized radiation includes an electrical field that is circularly polarized in a plane perpendicular to said axis.

2. The device of claim 1, wherein said source includes a laser.

3. The device of claim 1, wherein said radiation is circularly polarized.

4. The device of claim 1, wherein said at least one constituent is a dipolar molecule.

5. The device of claim 4, wherein said at least one dipolar molecule is a molecule of cyclopentadienyl thallium.

6. The device of claim 1, wherein said at least one constituent is selected from the group consisting of nanotubes and rings of nanoparticles.

7. The device of claim 6, further comprising;
   (c) a mechanism for cooling said at least one constituent.

8. The device of claim 7, wherein said mechanism includes a cryogenic liquid.

9. The device of claim 1, wherein said medium includes a plurality of said constituents.

10. The device of claim 9, further comprising:
    (c) a mechanism for maintaining said constituents in a common said orientation.

11. The device of claim 10, wherein said constituents include dipolar molecules, and wherein said mechanism includes an electric field.

12. The device of claim 10, wherein said constituents include constituents selected from the group consisting of nanotubes and rings of nanoparticles, and wherein said mechanism includes a planar substrate whereon said constituents are deposited.

13. A method of producing high frequency radiation, comprising the steps of:
    (a) providing a frequency multiplication medium including at least one constituent having approximate finite symmetry including an axis of approximate $C_n$ symmetry, wherein n is at least 3; and
    (b) directing elliptically polarized radiation at an angle to said axis such that said elliptically polarized radiation has an electric field that is circularly polarized in a plane perpendicular to said axis.

14. The method of claim 13, wherein said at least one constituent is a dipolar molecule.

15. The method of claim 13, wherein said at least one constituent is selected from the group consisting of nanotubes and rings of nanoparticles.

16. The method of claim 15, further comprising the step of:
    (c) cooling said at least one constituent to reduce dissipation.

17. The method of claim 13, wherein said medium includes a plurality of said constituents, the method further comprising the step of:
    (c) imposing a common orientation on said constituents.

18. The method of claim 17, wherein said constituents include dipolar molecules, and wherein said imposing is effected using an electric field.

19. The method of claim 13, wherein said elliptically polarized electromagnetic radiation is circularly polarized.

20. A device for producing high frequency radiation, comprising:
    (a) a source of elliptically polarized radiation; and
    (b) a frequency multiplication medium including a multiplicity of constituents sharing a common approximate shape and a common orientation aligned so that said elliptically polarized radiation has an electrical field that is circularly polarized in a plane perpendicular to said common orientation, each of said constituents having a longest dimension of at least about 6 Å.

21. The device of claim 20, wherein said longest dimension is at least about 100 nanometers.

22. The device of claim 20, wherein said source includes a laser.

23. The device of claim 20, wherein said electromagnetic radiation is circularly polarized.

24. The device of claim 20, wherein said constituents are selected from the group consisting of nanotubes and rings of nanoparticles.

25. The device of claim 24, further comprising:
    (c) a mechanism for cooling said constituents.

26. The device of claim 25, wherein said mechanism includes a cryogenic liquid.

27. A method of producing high frequency radiation, comprising the steps of:
    (a) providing a frequency multiplication medium including a plurality of constituents sharing a common approximate shape and a common orientation, each of said constituents having a longest dimension of at least about 6 Å; and
    (b) directing elliptically polarized radiation at an angle to said common orientation such that said elliptically polarized radiation has an electric field that is circularly polarized in a plane perpendicular to said common orientation.

28. The method of claim 27, wherein said longest dimension is at least about 100 nanometers.

29. The method of claim 27, wherein said constituents are selected from the group consisting of nanotubes and rings of nanoparticles.

30. The method of claim 29, further comprising the step of:
    (c) cooling said constituents to reduce dissipation.

31. The method of claim 27, wherein said electromagnetic radiation is circularly polarized.

* * * * *